(12) United States Patent
Yang et al.

(10) Patent No.: US 12,107,288 B2
(45) Date of Patent: Oct. 1, 2024

(54) FIREPROOF COMPONENT, BATTERY PACK, AND DEVICE USING BATTERY AS POWER SUPPLY

(71) Applicant: CONTEMPORARY AMPEREX TECHNOLOGY CO., LIMITED, Ningde (CN)

(72) Inventors: Shuo Yang, Ningde (CN); Chengjin Lin, Ningde (CN); Youxin Wu, Ningde (CN); Jinqing Ji, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 237 days.

(21) Appl. No.: 17/715,783

(22) Filed: Apr. 7, 2022

(65) Prior Publication Data
US 2022/0231370 A1   Jul. 21, 2022

Related U.S. Application Data

(63) Continuation of application No. PCT/CN2020/114930, filed on Sep. 12, 2020.

(30) Foreign Application Priority Data

Oct. 10, 2019   (CN) .......................... 201921689873.2

(51) Int. Cl.
*H01M 50/24*   (2021.01)
*A62C 3/16*    (2006.01)
*H01M 50/342*  (2021.01)

(52) U.S. Cl.
CPC ............... *H01M 50/24* (2021.01); *A62C 3/16* (2013.01); *H01M 50/3425* (2021.01); *H01M 2220/20* (2013.01)

(58) Field of Classification Search
CPC ............. H01M 50/24; H01M 50/3425; H01M 2220/20; H01M 50/209; H01M 50/383;
(Continued)

(56) References Cited

U.S. PATENT DOCUMENTS 3,584,135 A * 6/1971 Dowtin ............... H01M 50/204
220/378
2017/0117514 A1   4/2017 Yamada et al.
(Continued)

FOREIGN PATENT DOCUMENTS

CN          107093686 A       8/2017
CN          206896186   *     1/2018   ............... A47G 1/16
(Continued)

OTHER PUBLICATIONS

Machine English translation of CN 209374623 (Year: 2019).*
(Continued)

*Primary Examiner* — Michael L Dignan
(74) *Attorney, Agent, or Firm* — ANOVA LAW GROUP, PLLC

(57) ABSTRACT

This application provides a fireproof component, a battery pack, and a device using the battery pack as a power supply. The fireproof component includes a main body and a frame. The frame includes a body portion, an extension portion, and an opening defined by an inner peripheral face of the body portion. The extension portion is located circumferentially outside the body portion and connected to the body portion. The extension portion extends along a third direction that is perpendicular to a plane defined by the frame and protrudes beyond the body portion. The main body covers the opening of the frame and is connected to the body portion. The main body and the frame of the fireproof component are parts independent of each other, and therefore, can be made of different materials and in different molding processes.

11 Claims, 4 Drawing Sheets

(58) Field of Classification Search
CPC ..... H01M 50/249; H01M 50/242; A62C 3/16; E06B 5/16; Y02E 60/10
See application file for complete search history.

(56) References Cited

U.S. PATENT DOCUMENTS

| | | | | |
|---|---|---|---|---|
| 2019/0173063 A1* | 6/2019 | Muraishi | ............. | H01M 50/213 |
| 2019/0334143 A1* | 10/2019 | Sugeno | ............... | H01M 50/276 |
| 2020/0099029 A1* | 3/2020 | Du | ...................... | H01M 50/229 |
| 2022/0115737 A1* | 4/2022 | Shin | ................... | H01M 10/613 |

FOREIGN PATENT DOCUMENTS

| | | | | | |
|---|---|---|---|---|---|
| CN | 206896186 | U | | 1/2018 | |
| CN | 207199806 | | * | 4/2018 | .......... H01M 10/625 |
| CN | 108417743 | A | | 8/2018 | |
| CN | 109786613 | A | | 5/2019 | |
| CN | 209104234 | | * | 7/2019 | .............. H01M 2/10 |
| CN | 209104234 | U | | 7/2019 | |
| CN | 209183609 | U | | 7/2019 | |
| CN | 110271402 | A | | 9/2019 | |
| CN | 209374623 | | * | 9/2019 | .......... H01M 10/613 |
| CN | 211024883 | U | | 7/2020 | |
| JP | 2012049038 | A | | 3/2012 | |
| JP | 2018190486 | A | | 11/2018 | |
| JP | 2018536258 | A | | 12/2018 | |
| JP | 3221200 | U | | 5/2019 | |
| JP | 2019160774 | A | | 9/2019 | |
| KR | 20190094921 | A | | 8/2019 | |
| WO | 2018131221 | A1 | | 7/2018 | |

OTHER PUBLICATIONS

Machine English translation of CN 209104234 (Year: 2019).*
Machine English translation 206896186 (Year: 2018).*
The Japna Patent Office(JPO) The First Office Action for Japanese Application 2022-520922 May 22, 2023 4 Pages (With Translation).
The Japan Patent Office (JPO) Notice of Reasons for Refusal for JP Application No. 2022-520922 May 29, 2023 4 Pages(including translation).
The Japan Patent Office (JPO) Decision to Grant a Patent for JP Application No. 2022-520922 Oct. 30, 2023 5 Pages(including translation).
Contemporary Amperex Technology Co., Limited, International Search Report and Written Opinion, PCT/CN2020/114930, Aug. 10, 2022, 17 pgs.
Contemporary Amperex Technology Co., Limited, Extended European Search Rpt, EP20875536.3, Jan. 25, 2023, 7 pgs.
The European Patent Office (EPO) Communication pursuant to Article 94(3) EPC for Application No. 20875536.3 Jan. 11, 2024 4 Pages.
The Korean Intellectual Property Office Request for the Submission of an Opinion for Application No. 10-2022-7012244 Feb. 26, 2024 12 Pages (including translation).

* cited by examiner

FIREPROOF COMPONENT, BATTERY PACK, AND DEVICE USING BATTERY AS POWER SUPPLY

CROSS-REFERENCE TO RELATED APPLICATIONS

This application is a continuation application of PCT Patent Application No. PCT/CN2020/114930, entitled "FIREPROOF MEMBER, BATTERY PACK, AND DEVICE USING BATTERIES AS POWER SOURCE" filed on Sep. 12, 2020, which claims priority to Chinese Patent Application No. 201921689873.2, filed with the State Intellectual Property Office of the People's Republic of China on Oct. 10, 2019, and entitled "FIREPROOF COMPONENT, BATTERY PACK, AND DEVICE USING BATTERY AS POWER SUPPLY", all of which are incorporated herein by reference in their entirety.

TECHNICAL FIELD

Embodiments of this application relate to the technical field of batteries, and in particular, to a fireproof component, a battery pack, and a device using a battery as a power supply.

BACKGROUND

An electric vehicle primarily uses a high voltage provided by a battery pack as a power source. Currently, with the development of the new-energy electric vehicle industry, higher requirements are imposed on the safety of the battery in the battery pack in the entire industry. That is because, if the battery in the battery pack is affected by factors such as a short circuit and a high temperature when the battery pack is in use, a high-pressure gas is prone to be generated inside the battery and is prone to cause thermal runaway and accidents such as a fire or explosion.

To slow down the spread of thermal runaway of the battery to avoid the accidents such as a fire or explosion, an existing battery pack is generally equipped with a fireproof component. The fireproof component is generally a mica board, fireproof cloth, or the like. When the mica board, the fireproof cloth, and the like are fastened into the battery pack by bolts, a joint between the fireproof component and the battery pack is prone to incur problems such as crushing and cracking under a locking effect of the bolts.

SUMMARY

In view of the problems existent in the background technologies, an objective of this application is to provide a fireproof component, a battery pack, and a device using a battery as a power supply. The fireproof component is simply structured and easily moldable, thereby improving production efficiency. When the fireproof component is applied to the battery pack, problems such as crushing and cracking of the fireproof component are avoided, thereby improving safety and reliability of the battery pack.

To achieve the foregoing objective, this application provides a fireproof component for use in a battery pack. The fireproof component includes a main body and a frame. The frame includes a body portion, an extension portion, and an opening. An inner peripheral face of the body portion defines the opening. The extension portion is located circumferentially outside the body portion and connected to an outer peripheral face of the body portion. The extension portion extends along a third direction that is perpendicular to a plane defined by the frame and protrudes beyond the body portion. The main body covers the opening of the frame and is connected to the body portion. The main body and the frame are parts independent of each other, and the connection between the fireproof component and the battery module is implemented by screwing of the frame to the battery module, without a need to fix the main body to the battery module, thereby avoiding the problems such as crushing and cracking of the main body in a case of fixing the main body to the battery module, and improving safety of the fireproof component.

In the third direction, the main body is located at one side of the body portion of the frame; or the main body is accommodated in the opening.

In the third direction, the main body is located at one side of the body portion of the frame. A first connecting hole is disposed on the body portion, a second connecting hole is disposed on the main body, and the main body is connected to the body portion through the second connecting hole and the first connecting hole, thereby implementing a connection between the main body and the frame.

A third connecting hole is further disposed on the body portion of the frame, and the third connecting hole is disposed close to the extension portion in contrast with the first connecting hole. An avoidance notch is further disposed on the main body, and the avoidance notch is configured to expose the third connecting hole out of the main body. In this way, when the body portion of the frame is fixedly connected to the battery module through the third connecting hole, because the main body is not fixedly connected to the battery module directly, the main body is prevented from being damaged in a connecting process, thereby ensuring reliability of the connection between the fireproof component and the battery module.

The main body is a mica board. The mica board is resistant to a high temperature, thereby improving the high-temperature resistance of the main body.

The frame includes a plurality of connecting pieces. The plurality of connecting pieces are spliced together in tandem. Each of the connecting pieces includes a first plate portion and a second plate portion. The second plate portion extends along the third direction and protrudes beyond the first plate portion. The first plate portions of all the connecting pieces constitute the body portion of the frame, and the second plate portions of all the connecting pieces constitute the extension portion of the frame. The plurality of connecting pieces are spliced in tandem to form the frame. When a connecting piece in the frame is damaged, the connecting piece is replaceable without a need to replace the entire frame, thereby reducing replacement cost.

Each of the connecting pieces is a sheet metal part. The sheet metal part is formed by stamping, of which the technical process is mature, thereby helping to improve the production efficiency of the frame.

Along a circumferential direction of the frame, a positioning slot is disposed at an end of one of two adjacent connecting pieces, and the positioning slot accommodates an end of the other of the two adjacent connecting pieces. The positioning slot facilitates positioning of the two adjacent connecting pieces during installation.

The plurality of connecting pieces include two first connecting pieces and two second connecting pieces. The two first connecting pieces are spaced apart in a first direction, the two second connecting pieces are spaced apart in a second direction, and each of the second connecting pieces is connected to the two first connecting pieces.

This application further provides a battery pack, including a battery module and the foregoing fireproof component. A main body of the fireproof component and a body portion of a frame are located above the battery module. An extension portion is located circumferentially outside the battery module. The body portion of the frame is fixedly connected to the battery module. The battery module is fixed to the frame. In this way, the battery module is fixed to the fireproof component, thereby avoiding the problems such as crushing and cracking caused by a fixed connection between the battery module and the main body.

The battery module includes a plurality of batteries, and an explosion-proof valve is disposed in each of the batteries. A thickness of a part that is of the main body of the fireproof component and that corresponds to the explosion-proof valve is greater than a thickness of a part that is of the main body and that is located outside the explosion-proof valve, thereby preventing a high-temperature and high-pressure gas expelled out of the explosion-proof valve of the battery from crushing the main body when the battery module is thermally runaway.

The battery module is plural in number, and a plurality of battery modules are arranged in at least one row of module cells. The fireproof component is disposed on each row of module cells.

This application further provides a device that uses a battery as a power supply. The device includes a power source. The power source is configured to provide a driving force for the device. The foregoing battery pack configured to provide electrical energy to the power source.

Beneficial effects of this application are as follows:

The main body and the frame of the fireproof component are parts independent of each other, and therefore, can be made of different materials and formed separately in different molding processes. In this way, both the main body and the frame can be formed by using an appropriate molding process based on their respective materials, thereby helping to shorten a total molding time of the fireproof component, improving production efficiency, and ensuring high structural strength of the frame of the fireproof component. Therefore, when the frame is fixedly connected to the battery module, the main body does not need to be fixed to the battery module, thereby avoiding the problems such as crushing and cracking of the main body in a case of fixing the main body to the battery module. This improves safety of the fireproof component, and thereby improves safety and reliability of the battery pack in which the fireproof component is mounted.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

REFERENCE NUMERALS

Figure 1:
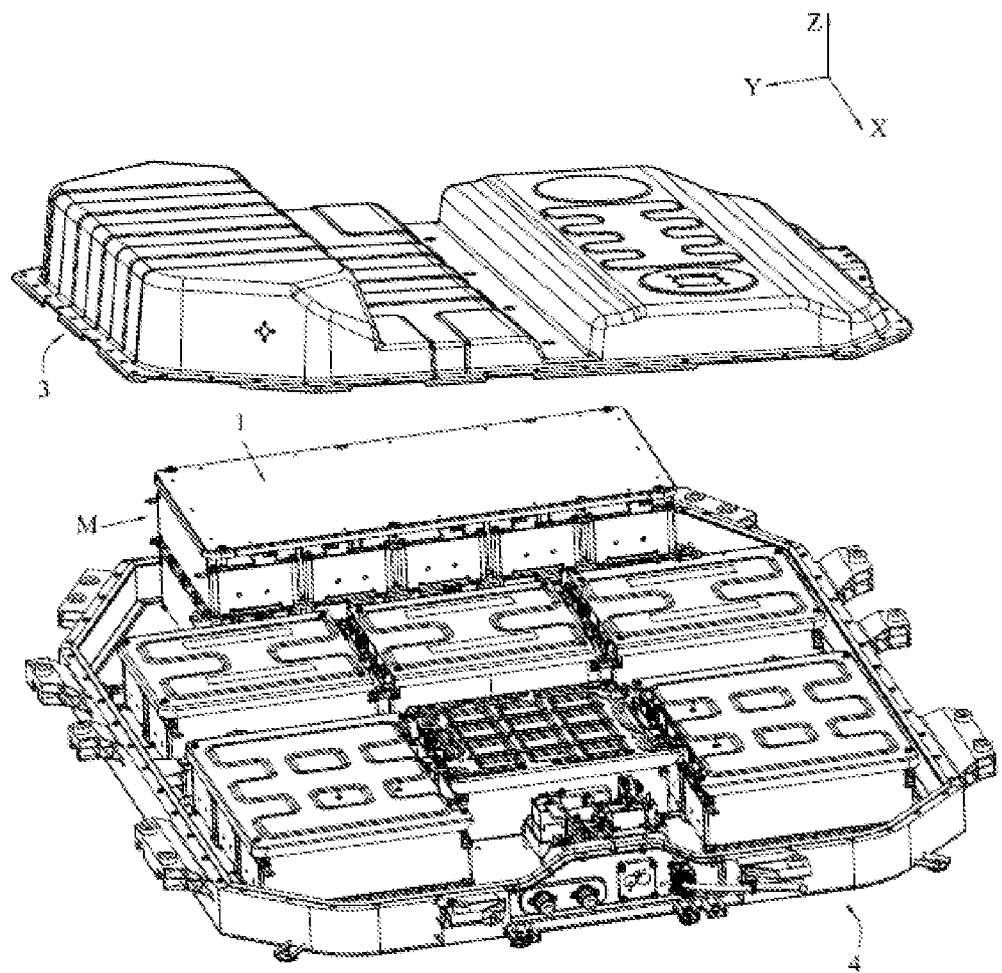
FIG. 1 is an exploded view of a battery pack according to this application.

1. Fireproof component;
11. Main body;
12. Frame;
12A. Body portion;
12B. Extension portion;
12C. Opening;
121. Connecting piece;
1211. First plate portion;
1212. Second plate portion;
1213. Positioning slot;
121A. First connecting piece;
121B. Second connecting piece;
T1. First connecting hole;
T2. Second connecting hole;
T3. Third connecting hole;
T4. Avoidance notch;
2. Battery module;
3. Upper box;
4. Lower box;
M. Module cell;
X. First direction;
Y. Second direction;
Z. Third direction.

DETAILED DESCRIPTION OF EMBODIMENTS

To make the objectives, technical solutions, and advantages of this application clearer, the following describes this application in further detail with reference to accompanying drawings and embodiments. Understandably, the specific embodiments described herein are merely intended to explain this application, but are not intended to limit this application.

In the context of this application, unless otherwise expressly specified, the terms "first", "second", and "third" are for the sole purpose of description rather than indicating or implying any order of preference; the term "a plurality of" means two or more (including two); unless otherwise expressly specified, the term "connect" needs to be understood in a broad sense. For example, a "connection" may be a fixed connection, or a detachable connection, or an integrated connection, or an electrical connection or signal connection; or may be a direct connection or an indirect connection implemented through an intermediate medium. A person of ordinary skill in the art understands the specific meanings of the terms in this application according to the context.

Understandably, in the context of this application, directional terms such as "on", "above", "under", and "below" described in the embodiments of this application are described from a perspective shown in the drawings, and are not to be understood as a limitation on the embodiments of this application. The following describes this application in further detail with reference to specific embodiments and accompanying drawings.

A device using a battery as a power supply according to this application includes a battery pack and a power source. The power source is configured to provide a driving force for the device, and the battery pack is configured to provide electrical energy to the power source. The device may be a mobile device such as a vehicle, a ship, or a small aircraft. The power source may be a battery pack and an engine, and the driving force provided by the power source may be solely electrical energy, or may include electrical energy and other types of energy (such as mechanical energy). Therefore, all devices that use a battery as a power supply fall within the protection scope of this application.

Using a vehicle as an example, a vehicle according to an embodiment of this application may be a new energy vehicle. The new energy vehicle may be a battery electric vehicle, or may be a hybrid electric vehicle, a range-extended electric vehicle, or the like. Specifically, the vehicle may include a vehicle body, a drive motor, a battery pack, a transmission mechanism, and wheels. The battery pack and the drive motor are disposed in the vehicle body. The battery pack is electrically connected to the drive motor to provide electrical energy for the drive motor. The drive motor is connected to the wheels on the vehicle body through the transmission mechanism, so as to drive the vehicle to move. Specifically, the battery pack may be horizontally disposed at a bottom of the vehicle body.

Figure 2:
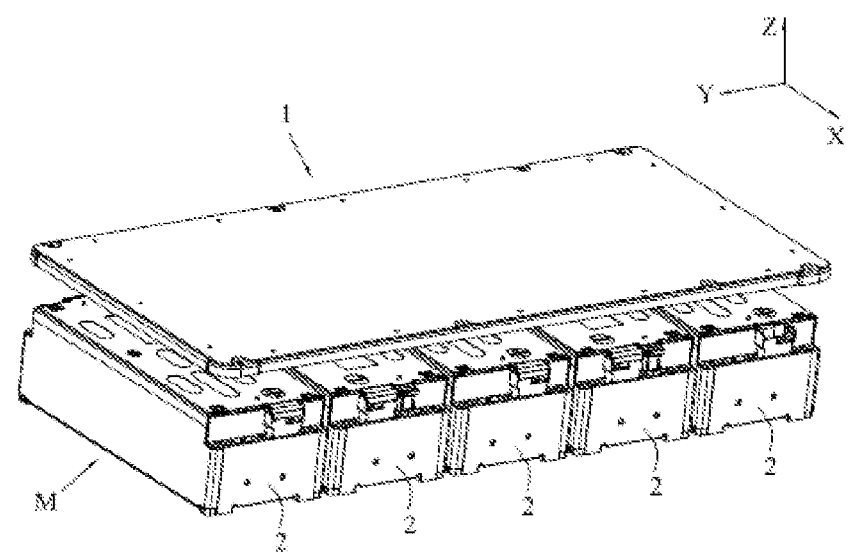
FIG. 2 is a schematic diagram of a location relationship between a fireproof component and a battery module shown in FIG. 1.

Referring to FIG. 1 and FIG. 2, the battery pack includes a fireproof component 1, a battery module 2, an upper box 3, and a lower box 4. The fireproof component 1 may be fixedly connected to the battery module 2 by a bolt. The lower box 4 fits with the upper box 3, and works together with the upper box 3 to accommodate the battery module 2 and the fireproof component 1. The battery module 2 includes a plurality of batteries. When a battery in the battery module 2 is thermally runaway, the fireproof component 1 can effectively slow down the spread of the thermal runaway of the battery, thereby avoiding occurrence of accidents such as a fire or explosion and improving safety and reliability of the battery pack.

Specifically, the battery module 2 may be one or plural in number. When the battery module 2 is plural in number, a plurality of battery modules 2 may be arranged in at least one row of module cells M. In this case, the fireproof component 1 may be disposed on each row of module cells M, as shown in FIG. 2.

Referring to FIG. 2 to FIG. 6, the fireproof component 1 may include a main body 11 (made of a fire-retardant material) and a frame 12. The frame 12 includes a body portion 12A, an extension portion 12B, and an opening 12C. The body portion 12A is a concentric square-shaped structure. An inner peripheral face of the body portion 12A defines the opening 12C. The extension portion 12B is located circumferentially outside the body portion 12A and connected to an outer peripheral face of the body portion 12A. The extension portion 12B extends along a third direction Z and protrudes beyond the body portion 12A. The main body 11 covers the opening 12C of the frame 12 and is connected to the body portion 12A. Specifically, the main body 11 may be connected to the body portion 12A of the frame 12 by riveting, welding, or bolting.

When the fireproof component 1 is applied in a battery pack, the main body 11 of the fireproof component 1 and the body portion 12A of the frame 12 are located above the battery module 2, the extension portion 12B is located circumferentially outside the battery module 2, and the body portion 12A of the frame 12 may be fixedly connected to the battery module 2 by a bolt. When the battery in the battery module 2 is thermally runaway, because the main body 11 of the fireproof component 1 is fire-retardant, the fireproof component 1 can effectively slow down the spread of the thermal runaway of the battery. In addition, because the body portion 12A and the extension portion 12B of the frame 12 together form an L-shaped structure, the frame 12 can lead a flame to spray downward, thereby preventing the flame from burning the upper box 3 (made of a composite material) of the battery pack, and improving safety and reliability of the battery pack.

The main body 11 and the frame 12 of the fireproof component 1 are parts independent of each other, and therefore, can be made of different materials and formed separately in different molding processes (in other words, the molding process of the frame 12 is not limited by the molding process of the main body 11). In this way, both the main body 11 and the frame 12 can be formed by using an appropriate molding process based on their respective materials, thereby helping to shorten a total molding time of the fireproof component 1, improving production efficiency, and ensuring high structural strength of the frame 12 of the fireproof component 1. Therefore, when the frame 12 is fixedly connected to the battery module 2, the problems such as crushing and cracking of the frame 12 under a locking force of the bolt are avoided, thereby improving safety and reliability of the battery pack.

A mica board is resistant to a high temperature. Therefore, in some embodiments, the main body 11 may be a mica board. The mica board includes a plurality of mica sheets (made of a mica material) and an adhesive disposed between every two adjacent mica sheets. The plurality of mica sheets and the adhesive may integrally form a flat slab structure by compression molding. Because the compression molding method works without a need to develop a mold, the main body 11 of the fireproof component 1 can be mass-produced rapidly.

Specifically, the main body 11 may be a mica board of uniform thickness. In order to improve an anti-ablation capability of the main body 11, the main body 11 may be a partially thick mica board. That is, a thickness of a part that is of the main body 11 and that corresponds to the explosion-proof valve of the battery is greater than a thickness of a part that is of the main body 11 and that is located outside the explosion-proof valve.

The frame 12 may be a sheet metal part and formed by stamping, and the sheet metal part is made of a metal material. The technique of forming by stamping is mature, thereby improving the production efficiency of the frame 12. In addition, due to high strength of the sheet metal part, when the frame 12 is fixedly connected to the battery module 2, the problems such as crushing and cracking of the frame 12 under a locking force of the bolt are avoided, thereby improving safety and reliability of the battery pack.

Figure 3:
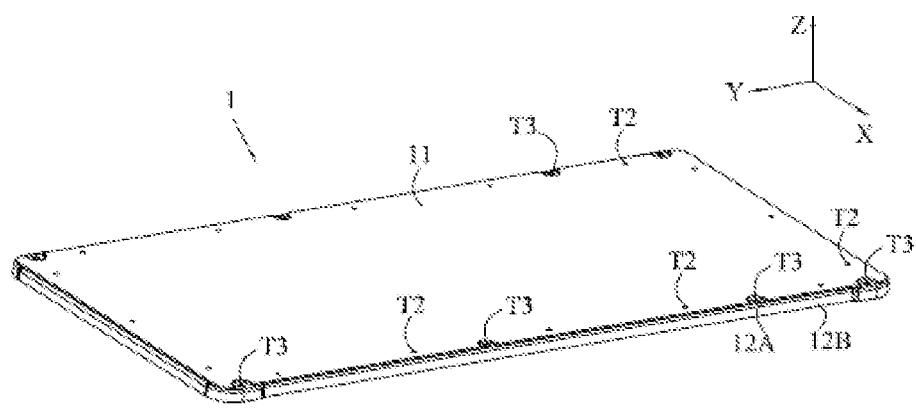
FIG. 3 is a three-dimensional view of the fireproof component shown in FIG. 2.
Figure 4:
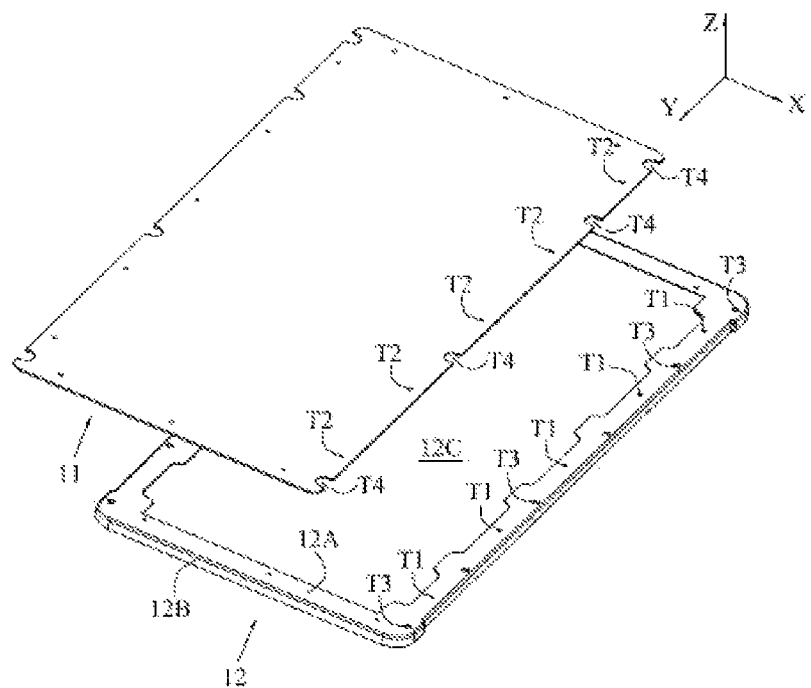
FIG. 4 is an exploded view of a fireproof component according to an embodiment.
Figure 5:
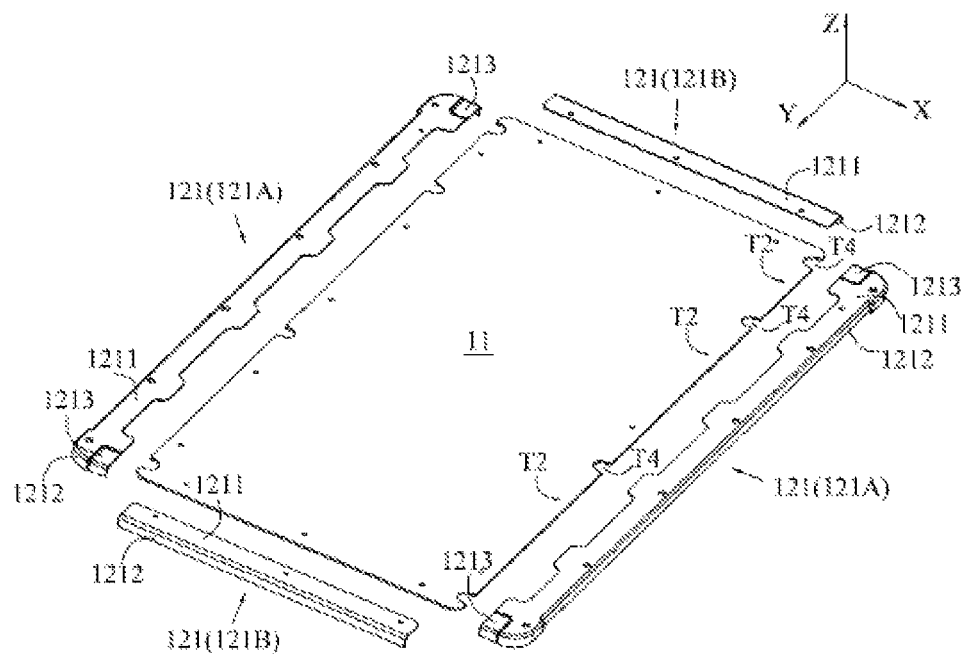
FIG. 5 is an exploded view of a fireproof component according to another embodiment.

In an embodiment, referring to FIG. 3 to FIG. 5, in the third direction Z, the main body 11 may be located on one side of the body portion 12A of the frame 12 and fixedly connected to the body portion 12A. That is, a part of the main body 11 overlaps the body portion 12A. Specifically, a first connecting hole T1 may be disposed on the body portion 12A of the frame 12, and a second connecting hole T2 may be disposed on the main body 11. The main body 11 is riveted or bolted to the body portion 12A through the second connecting hole T2 and the first connecting hole T1.

Referring to FIG. 3 to FIG. 6, a third connecting hole T3 may be further disposed on the body portion 12A of the frame 12, and the third connecting hole T3 is disposed close to the extension portion 12B in contrast with the first connecting hole T1. An avoidance notch T4 may be further disposed on the main body 11, and the avoidance notch T4 is configured to expose the third connecting hole T3 out of the main body 11. In this case, the body portion 12A of the frame 12 is fixedly connected to the battery module 2 through the third connecting hole T3. Because the main body 11 is not fixedly connected to the battery module 2 directly, the main body 11 is prevented from being damaged in a connecting process, thereby ensuring reliability of the connection between the fireproof component 1 and the battery module 2.

In another embodiment not shown, the main body 11 may be integrally accommodated in the opening 12C and fixedly connected to the inner peripheral face of the body portion 12A.

In an embodiment, referring to FIG. 4, the body portion 12A and the extension portion 12B of the frame 12 may be integrally formed.

Figure 6:
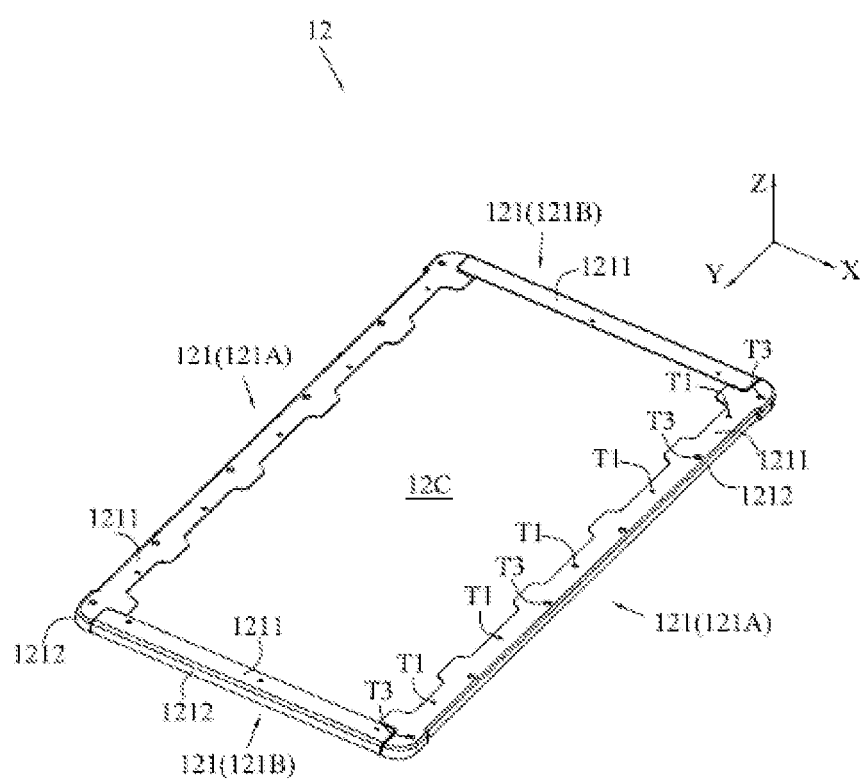
FIG. 6 is an assembly diagram of a frame shown in FIG. 5.

In another embodiment, referring to FIG. 5 and FIG. 6, the frame 12 may include a plurality of connecting pieces 121, and the plurality of connecting pieces 121 are spliced in tandem together circumferentially to form a hollow frame 12. Specifically, the splicing may be implemented by welding (such as spot welding), riveting or bolting. Each connecting piece 121 may be a sheet metal part and may be formed by stamping. A single connecting piece 121 is structurally simple and fast moldable, thereby improving the overall molding efficiency of the frame 12.

Each connecting piece 121 may include a first plate portion 1211 and a second plate portion 1212. The second plate portion 1212 extends along the third direction Z and protrudes beyond the first plate portion 1211. The first plate portions 1211 of all the connecting pieces 121 constitute the body portion 12A of the frame 12, and the second plate portions 1212 of all the connecting pieces 121 constitute the extension portion 12B of the frame 12.

To facilitate positioning and mounting of the plurality of connecting pieces 121, in a circumferential direction, a positioning slot 1213 is disposed at an end of one of two adjacent connecting pieces 121, and the positioning slot 1213 accommodates an end of the other of the two adjacent connecting pieces 121.

In an embodiment not shown, all the connecting pieces 121 may be the same in structure and in size. That is, the plurality of connecting pieces 121 are the same type of parts. In this case, the connecting pieces 121 are mass-producible, so that the production efficiency is improved.

In another embodiment, referring to FIG. 5 and FIG. 6, the plurality of connecting pieces 121 of the frame 12 may include two first connecting pieces 121A and two second connecting pieces 121B. The two first connecting pieces 121A are spaced apart in a first direction X. The two second connecting pieces 121B are spaced apart in a second direction Y. Each of the second connecting pieces 121B is connected to the two first connecting pieces 121A. In this case, the frame 12 includes just two types of parts (that is, the first connecting piece 121A and the second connecting piece 121B). Therefore, both the first connecting piece 121A and the second connecting piece 121B are mass-producible, so that the production efficiency is improved.

What is claimed is:

1. A fire proof component for use in a battery pack, the fireproof component comprising a main body and a frame;
    wherein the frame comprises a body portion, an extension portion, and an opening defined by an inner peripheral face of the body portion, the extension portion is located outside the body portion along a circumferential direction of the body portion and connected to an outer peripheral face of the body portion, and the extension portion extends along a third direction and protrudes beyond the body portion; and
    the main body covers the opening of the frame and is connected to the body portion;
    wherein the main body is a mica board;
    the battery module further comprises a plurality of batteries, and an explosion-proof valve is disposed in each of the batteries; and
    a first part of the main body corresponds to the explosion-proof valves, a second part of the main body is located outside the explosion-proof valves, and the thickness of the first part of the main body is greater than the thickness of the second part of the main body.

2. The fireproof component according to claim 1, wherein in the third direction, the main body is located at one side of the body portion of the frame; or
the main body is accommodated in the opening.

3. The fireproof component according to claim 1, wherein in the third direction, the main body is located at one side of the body portion of the frame; and
a first connecting hole is disposed on the body portion, a second connecting hole is disposed on the main body, and the main body is connected to the body portion through the second connecting hole and the first connecting hole.

4. The fireproof component according to claim 3, wherein a third connecting hole is further disposed on the body portion of the frame, and the third connecting hole is disposed close to the extension portion in contrast with the first connecting hole; and
an avoidance notch is further disposed on the main body, and the avoidance notch is configured to expose the third connecting hole out of the main body.

5. The fireproof component according to claim 1, wherein the frame comprises a plurality of connecting pieces, the plurality of connecting pieces are spliced together in tandem, each of the connecting pieces comprises a first plate portion and a second plate portion, and the second plate portion extends along the third direction and protrudes beyond the first plate portion; and
the first plate portions of all the connecting pieces constitute the body portion of the frame, and the second plate portions of all the connecting pieces constitute the extension portion of the frame.

6. The fireproof component according to claim 5, wherein each of the connecting pieces is a sheet metal part.

7. The fireproof component according to claim 5, wherein, along a circumferential direction of the frame, a positioning slot is disposed at an end of one of two adjacent connecting pieces, and the positioning slot accommodates an end of the other of the two adjacent connecting pieces.

8. The fireproof component according to claim 5, wherein the plurality of connecting pieces comprise two first connecting pieces and two second connecting pieces, the two first connecting pieces are spaced apart in a first direction, the two second connecting pieces are spaced apart in a second direction, and each of the second connecting pieces is connected to the two first connecting pieces.

9. The fireproof component according to claim 1, wherein the main body is a mica board comprising a plurality of mica sheets and an adhesive disposed between every two adjacent mica sheets.

10. A battery pack, comprising a battery module and a fireproof component, wherein the fireproof component comprises a main body and a frame;
    the frame comprises a body portion, an extension portion, and an opening defined by an inner peripheral face of the body portion, the extension portion is located outside the body portion along a circumferential direction of the body portion and connected to an outer peripheral face of the body portion, and the extension portion extends along a third direction and protrudes beyond the body portion;

the main body covers the opening of the frame and is connected to the body portion; and the main body of the fireproof component and the body portion of the frame are located above the battery module, the extension portion is located outside the battery module along a circumferential direction of the battery module, and the body portion of the frame is fixedly connected to the battery module;

wherein the main body is a mica board;

the battery module further comprises a plurality of batteries, and an explosion-proof valve is disposed in each of the batteries; and a first part of the main body corresponds to the explosion-proof valves, a second part of the main body is located outside the explosion-proof valves, and the thickness of the first part of the main body is greater than the thickness of the second part of the main body.

11. The battery pack according to claim 10, wherein the battery module is plural in number, and a plurality of battery modules are arranged in at least one row of module cells; and the fireproof component is disposed on each row of module cells.

\* \* \* \* \*